United States Patent
Bates et al.

(10) Patent No.: US 8,094,406 B2
(45) Date of Patent: *Jan. 10, 2012

(54) APPARATUS AND METHOD TO ADJUST THE POSITIONS OF A WRITE ELEMENT AND READ ELEMENT DISPOSED ON A READ/WRITE HEAD

(75) Inventors: Allen Keith Bates, Tucson, AZ (US); Nhan Xuan Bui, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/475,777

(22) Filed: Jun. 1, 2009

(65) Prior Publication Data

US 2010/0302677 A1 Dec. 2, 2010

(51) Int. Cl.
  *G11B 5/584* (2006.01)
  *G11B 5/58* (2006.01)
  *G11B 20/20* (2006.01)
(52) U.S. Cl. .............. 360/77.12; 360/77.01; 360/76
(58) Field of Classification Search .......... None
  See application file for complete search history.

(56) References Cited

U.S. PATENT DOCUMENTS

| | | | |
|---|---|---|---|
| 5,278,712 A | 1/1994 | Sugaya | |
| 5,282,103 A | 1/1994 | Hatch et al. | |
| 5,691,857 A | 11/1997 | Fitzpatrick et al. | |
| 6,580,581 B1 | 6/2003 | Bui et al. | |
| 6,771,456 B2 | 8/2004 | Winarski et al. | |
| RE39,478 E | 1/2007 | Hatch et al. | |
| 7,342,738 B1 * | 3/2008 | Anderson et al. | 360/77.12 |
| 7,436,621 B2 * | 10/2008 | Goker et al. | 360/76 |
| 7,538,966 B2 * | 5/2009 | Day | 360/76 |
| 7,764,460 B2 * | 7/2010 | Bates et al. | 360/77.12 |

* cited by examiner

*Primary Examiner* — Andrew L Sniezek
(74) *Attorney, Agent, or Firm* — Dale F. Regelman; Quarles & Brady LLP (57) ABSTRACT

A method to adjust the positions of a write element and read element disposed on a read/write head comprising a first assembly independently moveable along a first axis and comprising a first servo element, a second servo element, and the write element disposed between the first servo element and the second servo element and a second assembly independently moveable along the first axis and comprising a third servo element, a fourth servo element, and the read element disposed between the third servo element and the fourth servo element. The method moves a sequential information storage medium adjacent to the read/write head along a second axis, wherein the second axis is substantially orthogonal to the first axis, and determines a dynamic skew for the sequential information storage medium with respect to the read/write head using the first servo element and the second servo element. The method then positions the first assembly with respect to the second assembly to correct for that dynamic skew angle.

9 Claims, 13 Drawing Sheets

APPARATUS AND METHOD TO ADJUST THE POSITIONS OF A WRITE ELEMENT AND READ ELEMENT DISPOSED ON A READ/WRITE HEAD

FIELD OF THE INVENTION

The invention is directed to a method to adjust the positions of a write element and read element disposed on a read/write head.

BACKGROUND OF THE INVENTION

It is known in the art to save data in automated data storage libraries comprising a plurality of sequential information storage media, such as magnetic tapes, and one or more sequential information storage media drives. In order to verify a successfully write operation, it is known in the art to pair a read element with each write element, and to immediately read information encoded in the sequential information storage medium.

As the position of a sequential information storage medium varies with respect to a read/write head comprising a plurality of paired write and read elements, one or more read elements may not be able to detect the information encoded by an associated write element.

SUMMARY OF THE INVENTION

A method is presented to adjust the positions of a write element and read element disposed on a read/write head comprising a first assembly independently moveable along a first axis and comprising a first servo element, a second servo element, and the write element disposed between the first servo element and the second servo element and a second assembly independently moveable along the first axis and comprising a third servo element, a fourth servo element, and the read element disposed between the third servo element and the fourth servo element. The method moves a sequential information storage medium adjacent to the read/write head along a second axis, wherein the second axis is substantially orthogonal to the first axis, and determines a dynamic skew for the sequential information storage medium with respect to the read/write head using the first servo element and the second servo element. The method then positions the first assembly with respect to the second assembly to correct for that dynamic skew.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 8:
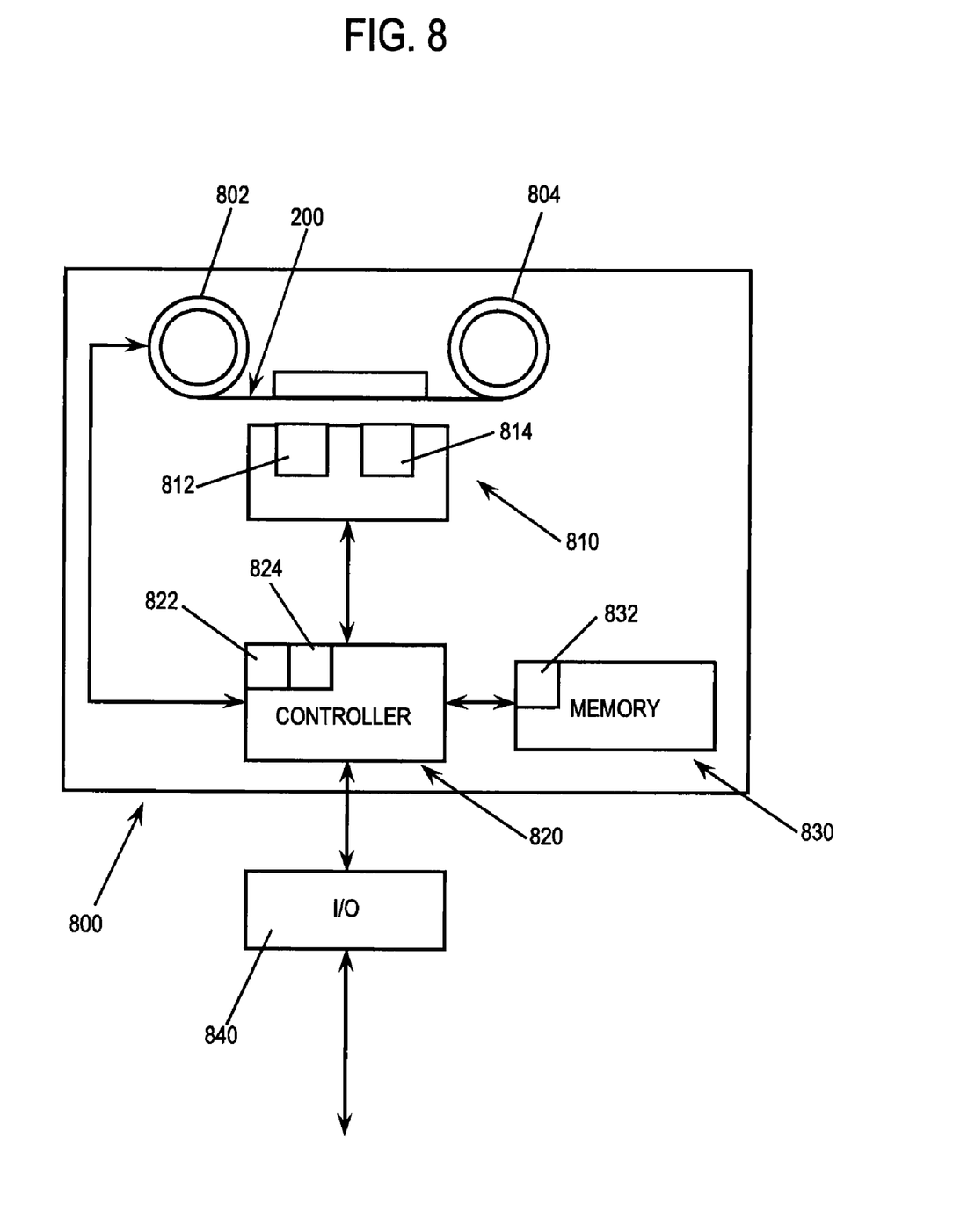
FIG. 8 is a block diagram illustrating Applicants' tape drive apparatus.

Referring now to FIG. 8, when writing data to a sequential information storage medium 200 (FIGS. 2A, 2B, 3A, 3C, 8), such as a magnetic tape, a portion of the medium is disposed on a first rotatable reel, such as reel 802, and a portion of the medium is disposed on a second rotatable reel, such as reel 804. The rotatable reels are moved such that sequential information storage medium 200 is moved from one reel, past read/write head 810, and onto to the other reel. Read/write head 810 comprises write element 812 and corresponding read element 814. Write element 812 encodes information in tape storage medium 200 as that medium travels past write element 812. In order to verify a successful write operation, read element 814 immediately reads the information encoded by write element 812. As those skilled in the art will appreciate, read/write head 810 may comprise other elements and components not shown in FIG. 8.

In the illustrated embodiment of FIG. 8, read/write head 810 is in communication with controller 820. In certain embodiments, controller 820 is integral with read/write head 810. Further in the illustrated embodiment of FIG. 8, controller comprises processor 822 and data buffer 824. Controller 820 is in communication with computer readable medium 830 and host I/O chip 840. Instructions 832 are encoded in computer readable medium 830.

In certain embodiments, computer readable medium 830 is integral with controller 820. In the illustrated embodiment of FIG. 8, reel 802, reel 804, read/write head 810, controller 820, and computer readable medium 830 are disposed within a drive apparatus 800. As those skilled in the art will appreciate, drive apparatus 800 may comprise other elements and components not shown in FIG. 8.

Figure 1:
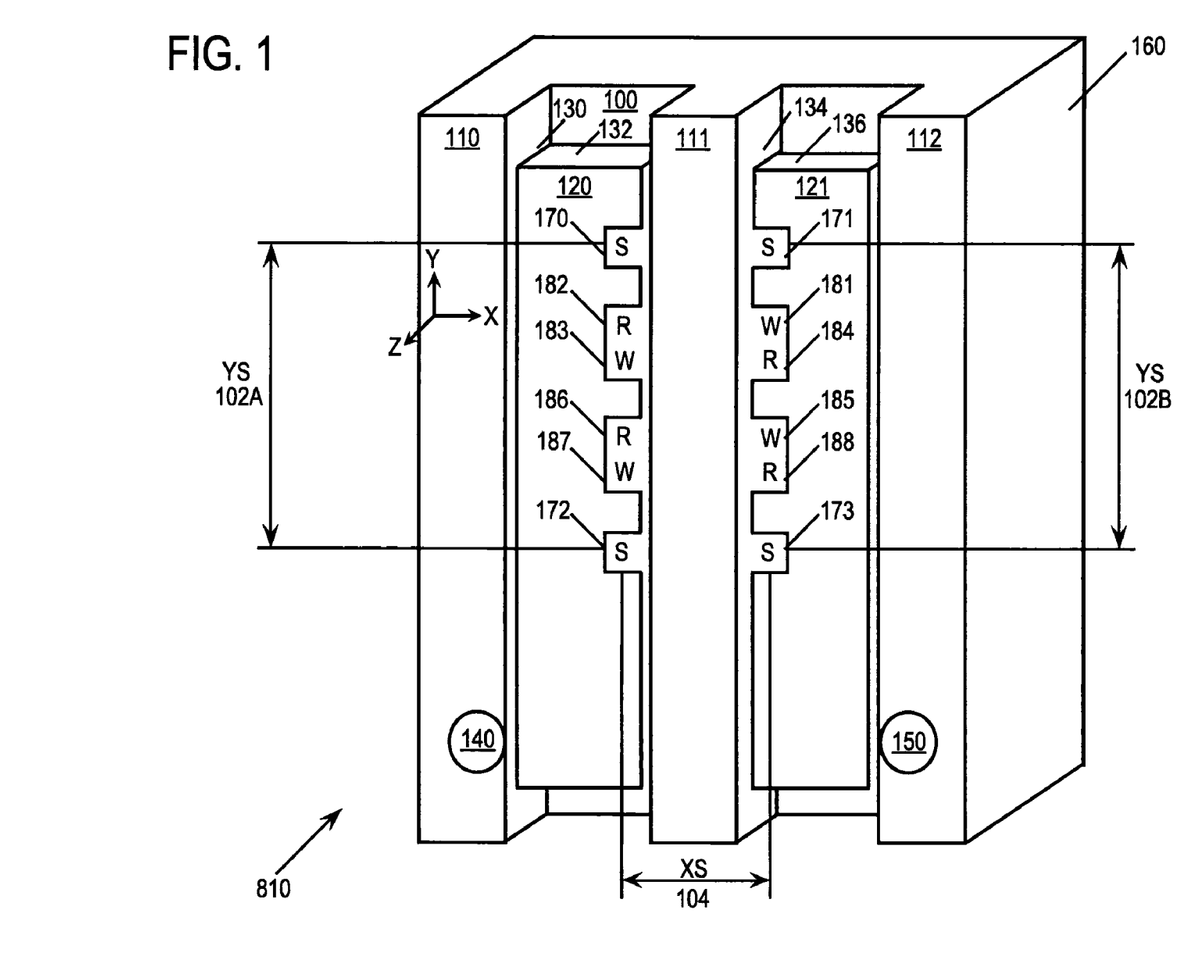
FIG. 1 is perspective view of Applicants' read/write head.

FIG. 1 depicts read/write head 810. Magnetic or optical tape moves across the head 810 along the +/−X direction. The read/write head 810 comprises microsliders 120 and 121 that are articulated, i.e. moveable, in the +/−Y direction, which is considered the transverse or lateral direction relative to the direction in which the tape moves across head 810. Microsliders 120 and 121 are constrained in the X direction by walls 110, 111 and 112, as depicted. Movement of microsliders 120 and 121 is provided by controllable micromotors 140 and 150, respectively. Micromotors are disposed in the walls, as shown, and are in mechanical contact with the microsliders, preferably in a rack and pinion relationship.

Alternatively, the micromotors could be above or below the microsliders, or disposed underneath the microsliders. At the outset, the microsliders provide "fine" position movement of the head elements (e.g., read, write, servo) with respect to the tape. "Coarse" position movement along the +/−Y direction is provided in a conventional manner, i.e., by moving the entire head body block 160. "Fine," as used herein means movement of the microsliders along the +/−Y direction with greater resolution and faster dynamic response than the smallest incremental "coarse" movement, and will be described herein with reference to movement of the microsliders. Likewise, "coarse" as used herein means movement outside the range of the "fine" movement range, and will generally be described herein with reference to movement of the entire head. Of course, overlap could exist between fine and coarse position movement, and the present invention is intended to cover a range of fine and coarse movement.

Dynamically responsive fine seek capability is provided by microsliders 120 and 121, due to their inherently low mass. As is depicted, microsliders 120 and 121 include the servo read elements (S) 170, 171, 172, and 173; data write elements (W) 181, 183, 185, 187; and the data read elements (R) 182, 184, 186, and 188. In exemplary embodiments, read/write head 810 comprises a plurality of read/write elements 181-188 for data input and output. Single element read heads may be used for the servo elements 170-173. The number of read/write elements per microslider is a function of the quantity of grouped data tracks per module desired. The read, write, and servo elements can be attached to the microsliders 120 or 121 using adhesive or epoxy, or photolithographed directly to the microsliders, in a manner well understood in this art.

In the illustrated embodiment of FIG. 1, servo read element 172 is disposed a distance 102a along the depicted Y axis from servo read element 170. Similarly, servo read element 173 is disposed a distance 102b along the Y axis from servo read element 171. In certain embodiments, distance 102a equals distance 102b, called YS 102. Further in the illustrated embodiment of FIG. 1, servo read element 173 is disposed a distance 104 along the depicted X axis from servo read element 172 called XS.

To permit bi-directional tape flow and write and read-verify operation, a read head on slider 120 is positioned in line, along the X axis, relative to a write head on slider 121. For example, when the tape is moving in the +X direction, write elements 183 and 187 would write data and read element 184 and 188, respectively would read-verify that data. Then, when the tape is moving in the −X direction, write elements 181 and 185 would write data and read element 182 and 186, respectively would read-verify that data.

Microsliders 120-121 are disposed generally parallel to one another, and are arranged so that corresponding read/write elements are aligned. The present invention contemplates that microsliders 120-121 need not be exactly parallel, but may be arranged other than in parallel alignment provided that the read, write and/or servo processes are not hindered significantly.

It will be understood to those skilled in the art that micromotors 140 and 150 are depicted in FIG. 1 as comprising rotary-type motors. However, microsliders 120 and 121 could similarly be moved in the Y direction by linear stepper motors in which the microsliders themselves could comprise the moving portion of the linear motor. In such a construction, the step resolution for the linear motor would be designed to be within the resolution of the fine seek movement.

Figure 7A:
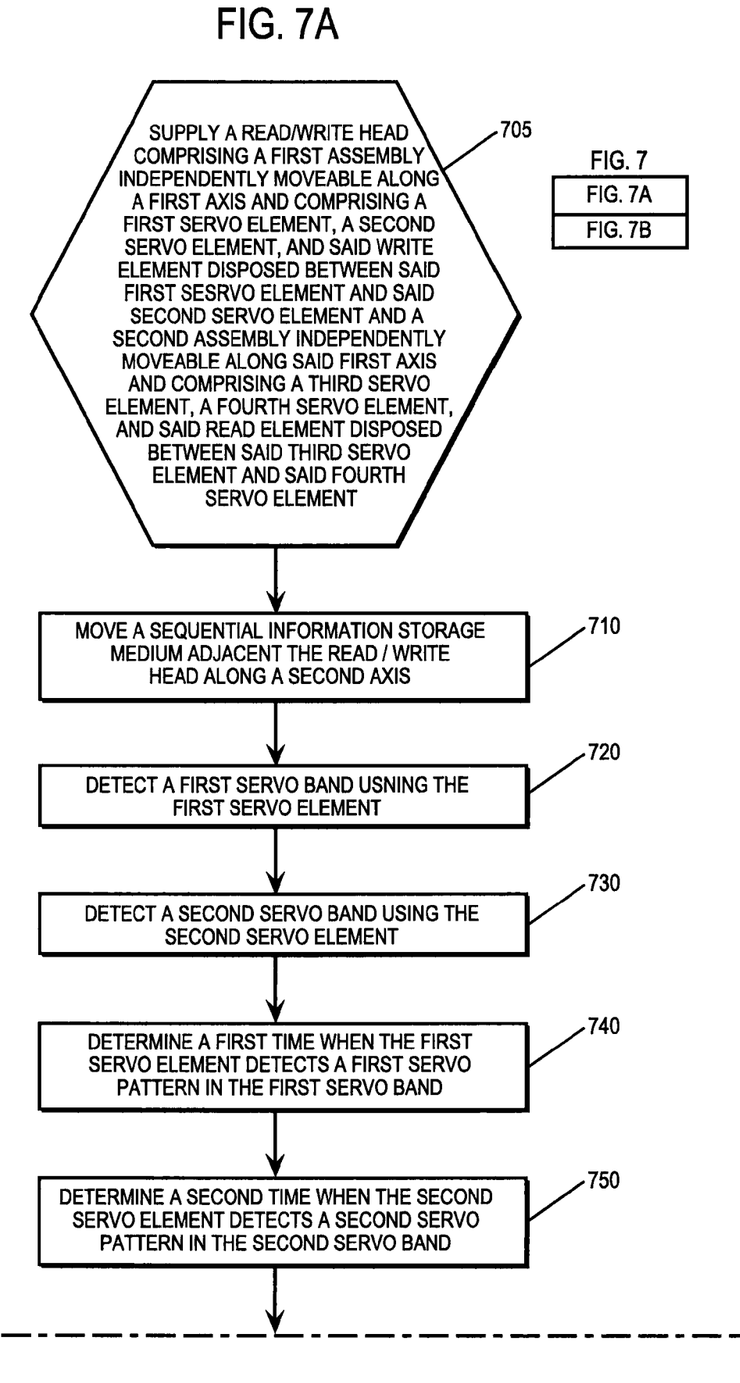
FIG. 7A is a flow chart summarizing Applicants' method.
Figure 7B:
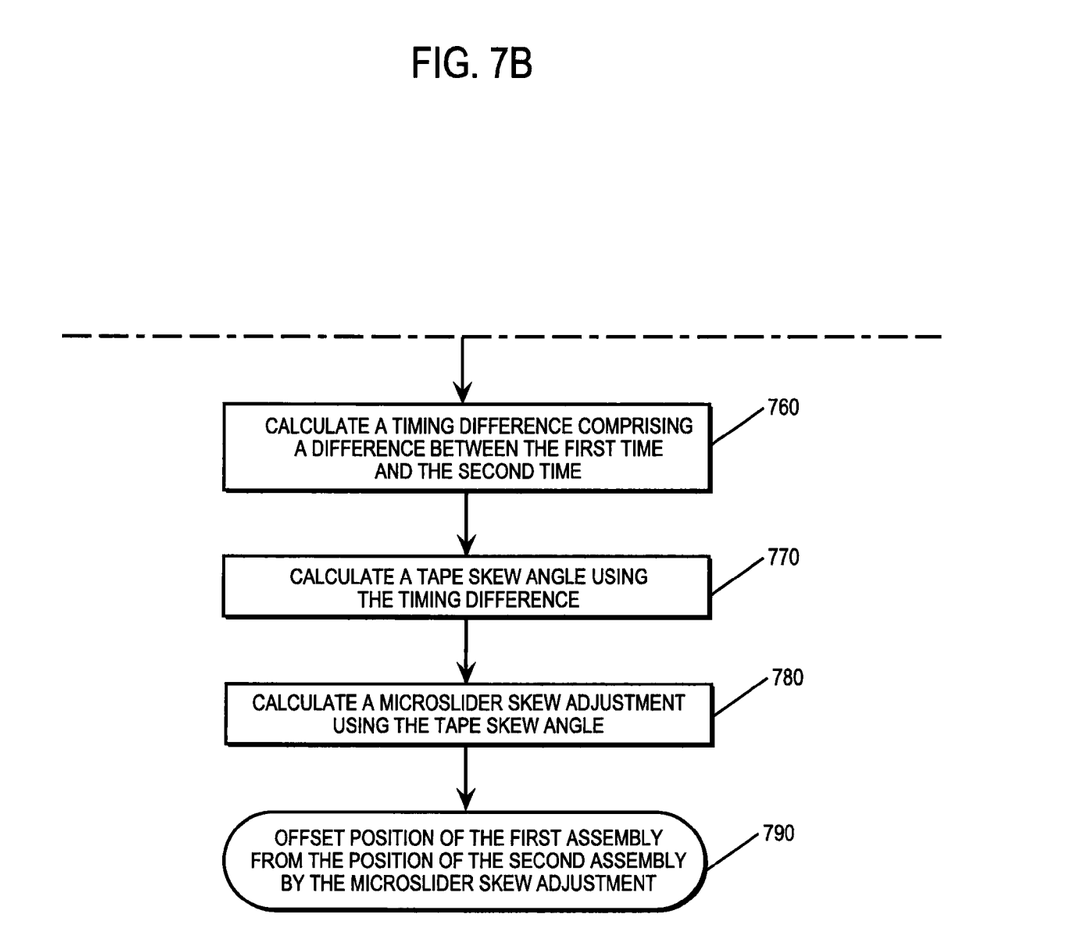
FIG. 7B is a flow chart summarizing certain additional steps of Applicants' method.

Applicants' invention comprises a method to adjust the positions of microsliders 120 and 121 to correct for dynamic skew of a sequential information storage medium, such as for example a magnetic tape, as that medium is moved adjacent to a read/write head, such as read/write head 810, comprising microsliders 120 and 121. FIGS. 7A and 7B summarizes Applicants' method. Referring now to FIG. 7A, in step 705 the method supplies a read/write head comprising a first assembly independently moveable along a first axis, such as for example microslider 120 which is bidirectionally moveable along the Y axis of FIG. 1, and comprising a first servo element, a second servo element, and said write element disposed between the first servo element and the second servo element and a second assembly independently moveable along the first axis, such as for example microslider 121 which is bidirectionally moveable along the Y axis of FIG. 1, and comprising a third servo element, a fourth servo element, and the read element disposed between the third servo element and the fourth servo element In step 710, the method moves a sequential information storage medium adjacent the read/write head along a second axis, such as the X axis shown in FIG. 1, wherein that second axis is essentially orthogonal to the first axis. By "substantially orthogonal," Applicants mean the second axis in combination with the first axis defines an angle of ninety degrees (90°), plus or minus ten degrees (10°).

Figure 2A:
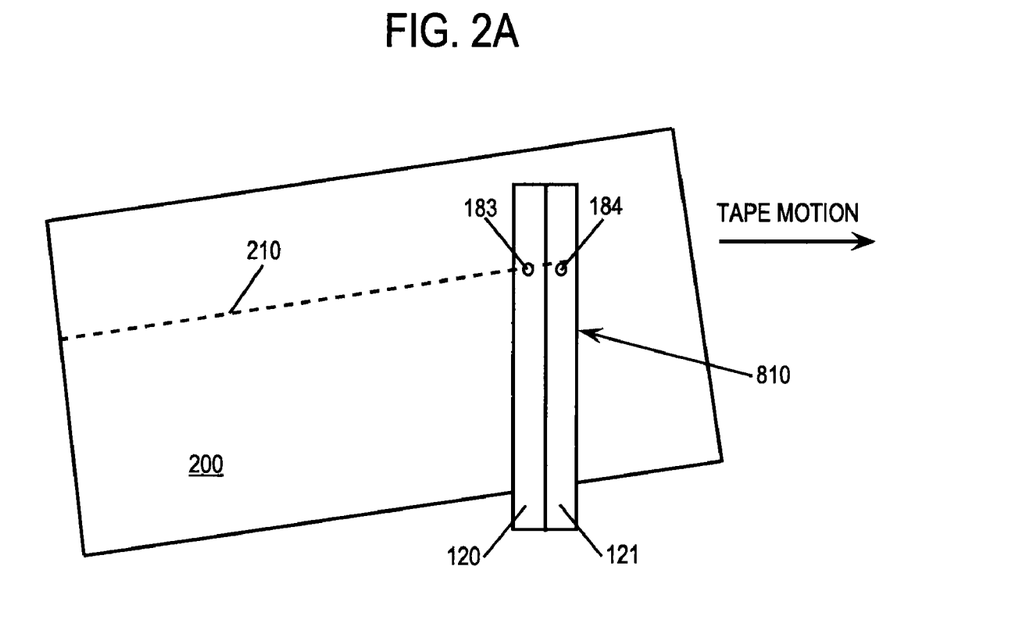
FIG. 2A is top view illustrating a sequential tape medium being moved adjacent Applicants' rear/write head, wherein the movement of the medium is skewed with respect to the read/write head.

In the illustrated embodiment of FIG. 2A, data write element 183 on module 120 is encoding data track 210 into tape medium 200 as tape medium travels past read/write head 810 at a tape velocity V_tape. The alignment of tape medium 200, however, is skewed with respect to read/write head 810. By "skewed," Applicants mean that data track 210 is not perfectly orthogonal to the Y axis (FIG. 1) of read/write head 810. In the illustrated embodiment of FIG. 2A, data track 210 is skewed in a first direction such that data track 810 and the Y axis of read/write head 810 define an angle less than ninety degrees (90°). In other embodiments, the alignment of tape medium 200 can be skewed in a second direction such that data track 210 and the Y axis of read/write head 810 define an angle greater than ninety degrees (90°).

Figure 2B:
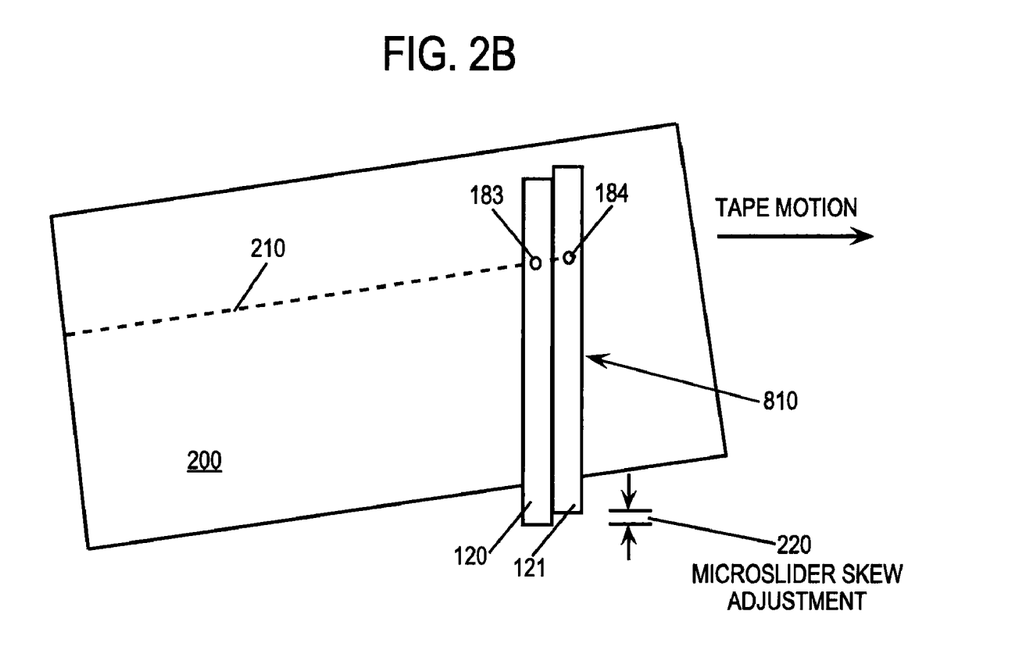
FIG. 2B illustrates the moving sequential information storage medium of FIG. 2A wherein the position of one microslider assembly with respect to the other microslider assembly has been adjusted to correct for the dynamic skew.

In the illustrated embodiment of FIG. 2B, microslider 121 has been moved upwardly along the Y axis of read/write head 810 a microslider skew adjustment distance 220 sufficient to align data read element 184 with data track 210. By adjusting the position of microslider 121 with respect to microslider 120, Applicants' method adjusts the position of a data read element with respect to an associated data write element to correct for skewed movement of tape medium 200 with respect to read/write head 810.

Referring once again to FIG. 7A, in step 720 the method detects a first servo band using the first servo element of step 705, such as for example servo element 170 (FIG. 1). In certain embodiments, step 720 is performed by a controller, such as controller 820, in communication with the read/write head of step 705. In step 730, the method detects a second servo band using the second servo element of step 705, such as for example servo element 172 (FIG. 1). In certain embodiments, step 730 is performed by a controller, such as controller 820, in communication with the read/write head of step 705.

Figure 3A:
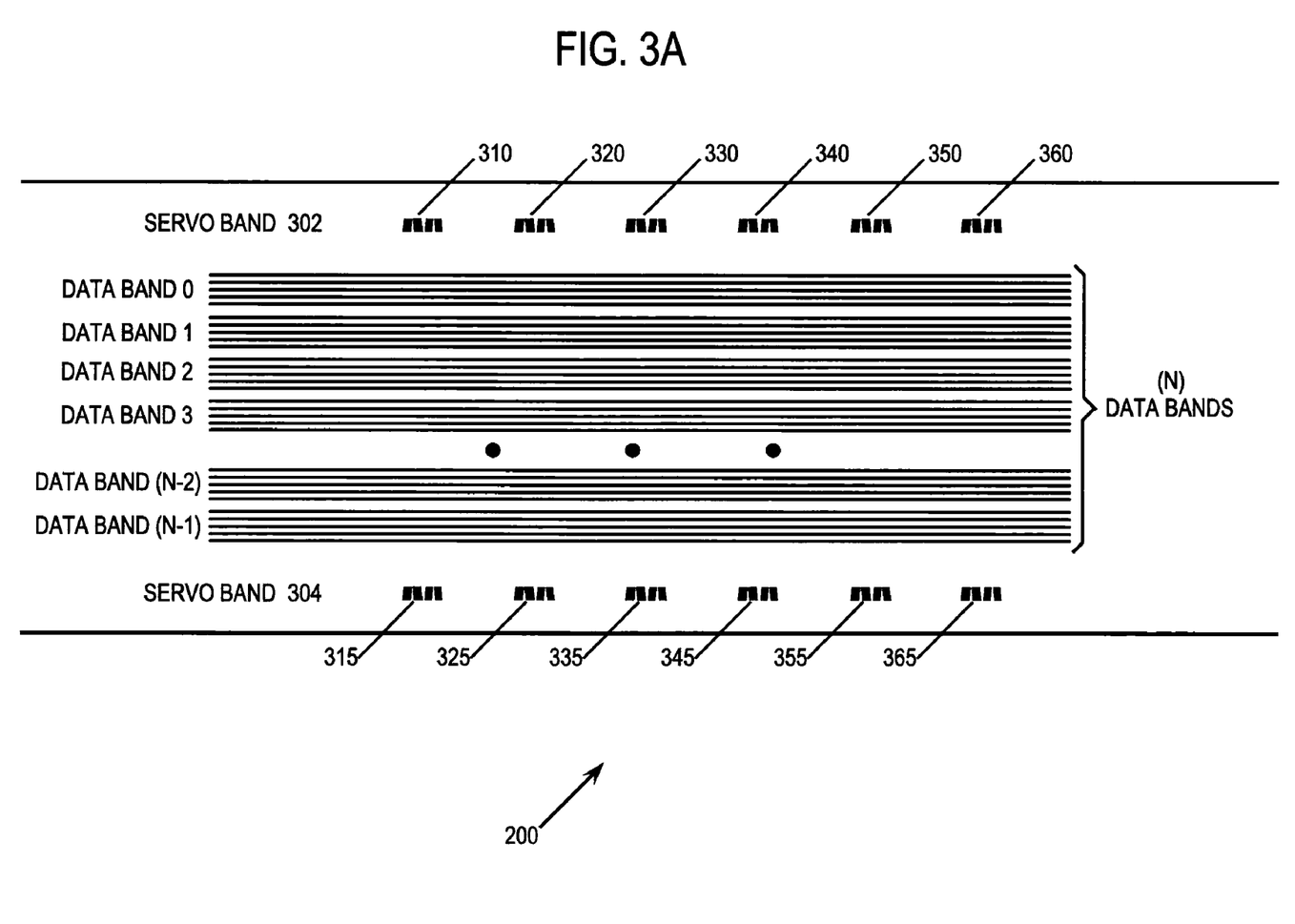
FIG. 3A is a block diagram illustrating a first sequential information storage medium architecture.

In the illustrated embodiment of FIG. 3A, tape medium 200 comprises a first servo band 302, a second servo band 304, and (N) data bands written between servo band 302 and servo band 304. Servo band 302 comprises servo patterns 310, 320, 330, 340, 350, and 360. Servo band 304 comprises servo patterns 315, 325, 335, 345, 355, and 365. In the illustrated embodiment of FIG. 3A, servo pattern 310 and 315 are aligned with one another, such that if tape medium 200 is moved orthogonal to read/write head 810, servo element 170 detects servo pattern 310 at the same time that servo element 172 detects servo pattern 315.

Referring once again to FIG. 7A, in step 740 the method determines a first time when the first servo element detects a first pattern disposed in the first servo band. In certain embodiments, step 740 is performed by a controller, such as controller 820, in communication with the read/write head of step 705. In step 750, the method detects a second time when the second servo element detects a second servo pattern in the second servo band. In certain embodiments, step 750 is performed by a controller, such as controller 820, in communication with the read/write head of step 705. In step 760, the method calculates a timing difference between the first time and the second time. In certain embodiments, step 760 is performed by a controller, such as controller 820, in communication with the read/write head of step 705.

Referring to FIGS. 1, 2A, 3A, and 3B, if tape medium 200 is moved past read/write head 810 in the skewed orientation of FIG. 2A, then servo element 172 detects servo pattern 315 before servo element 170 detects servo pattern 310. Servo element 172 first detects the initial portion of servo pattern 315 at time $T_{315}$Start, and lastly detects the final portion of servo pattern 315 at time $T_{315}$End. The midpoint $T_{315}$Midpoint represents the time when servo element 172 detects the middle portion of servo pattern 315.

Figure 3B:
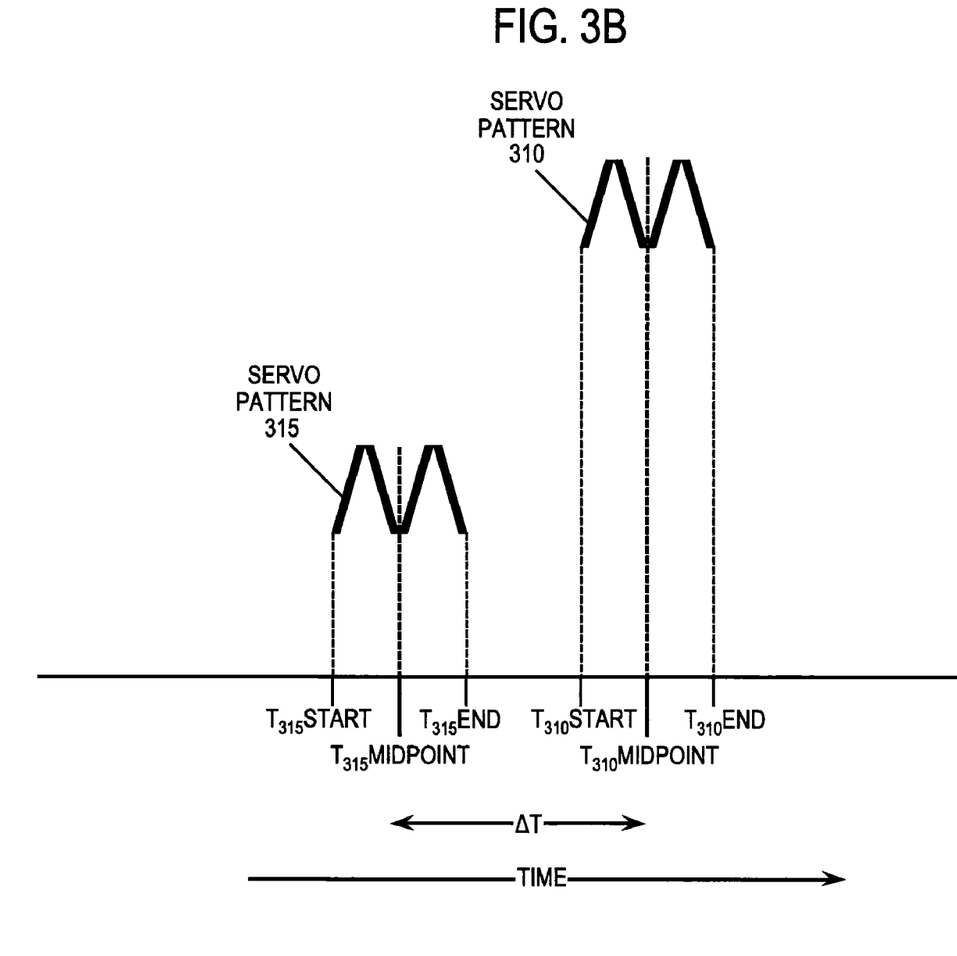
FIG. 3B illustrates timings when associated servo patterns are detected using the sequential information storage medium architecture of FIG. 3A and the dynamic skew of FIGS. 2A and 2B.

Servo element 170 first detects the initial portion of servo pattern 310 at time $T_{310}$Start, and lastly detects the final portion of servo pattern 310 at time $T_{310}$End. The midpoint $T_{310}$Midpoint represents the time when servo element 170 detects the middle portion of servo pattern 310.

The timing difference $\Delta T$ represents the difference between time $T_{315}$Midpoint and time $T_{310}$Midpoint. When using the tape architecture of FIG. 3A, timing difference $\Delta T$ is zero if tape medium 200 is moved orthogonally to read/write head 810. As the angle defined by data track 210 and the Y axis of read/write head 810 increasingly deviates from ninety degrees, in either direction, the magnitude of the timing difference $\Delta T$ increases.

Figure 3C:
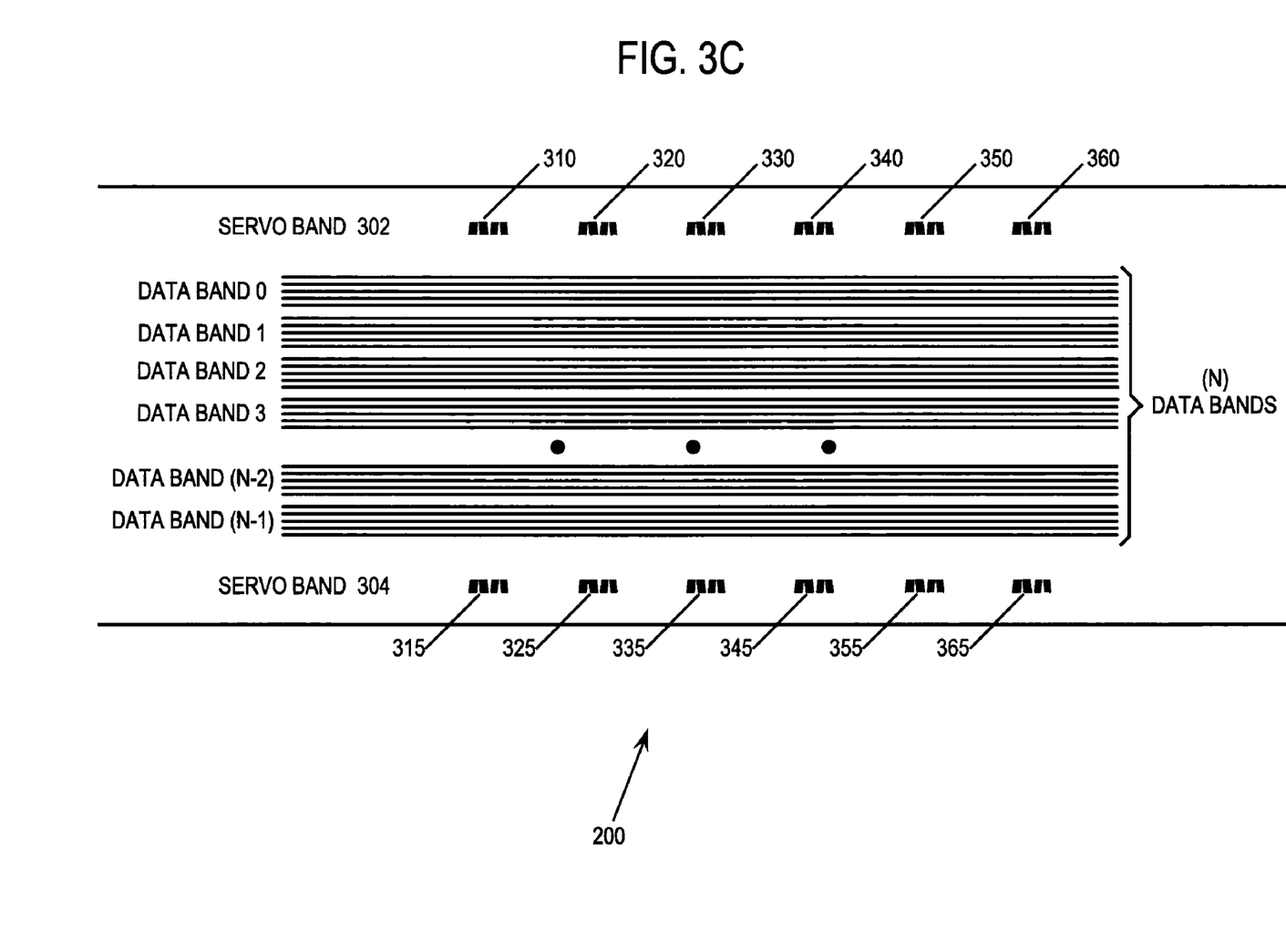
FIG. 3C is a block diagram illustrating a second sequential information storage medium architecture.
Figure 3D:
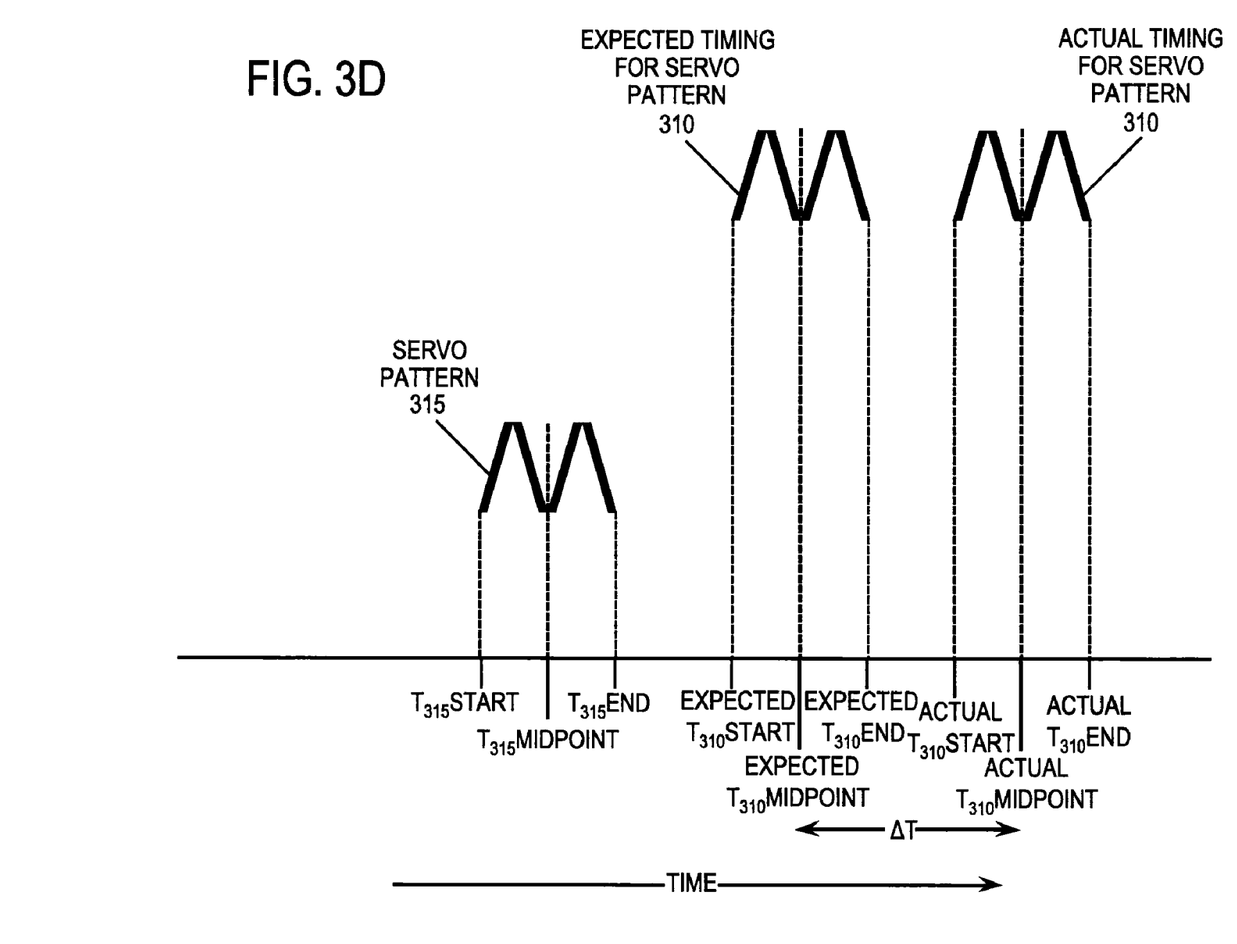
FIG. 3D illustrates timings when associated servo patterns are detected using the sequential information storage medium architecture of FIG. 3C and the dynamic skew of FIGS. 2A and 2B.

Referring now to FIG. 3C, in certain sequential information storage medium architectures servo patterns encoded in servo bands 302 and 304 are intentionally offset from one another. In the illustrated embodiment of FIG. 3C, the individual servo patterns comprising servo pattern pairs 310/315, 320/325, 330/335, 340/345, 350/355, and 360/365, are offset from one another. Referring now to FIGS. 3C and 3D, when using a sequential information storage medium architecture of FIG. 3C, Applicants' method determines a timing difference defined by a time a servo pattern midpoint is expected to be detected, such as for example Expected $T_{310}$Midpoint, and a time that a servo pattern midpoint is actually detected, such as Actual $T_{310}$Midpoint.

Referring once again to FIG. 7B, in step 770 the method calculates a tape skew angle using the timing difference of step 760. In certain embodiments, step 770 is performed by a controller, such as controller 820, in communication with the read/write head of step 705.

Figure 4A:
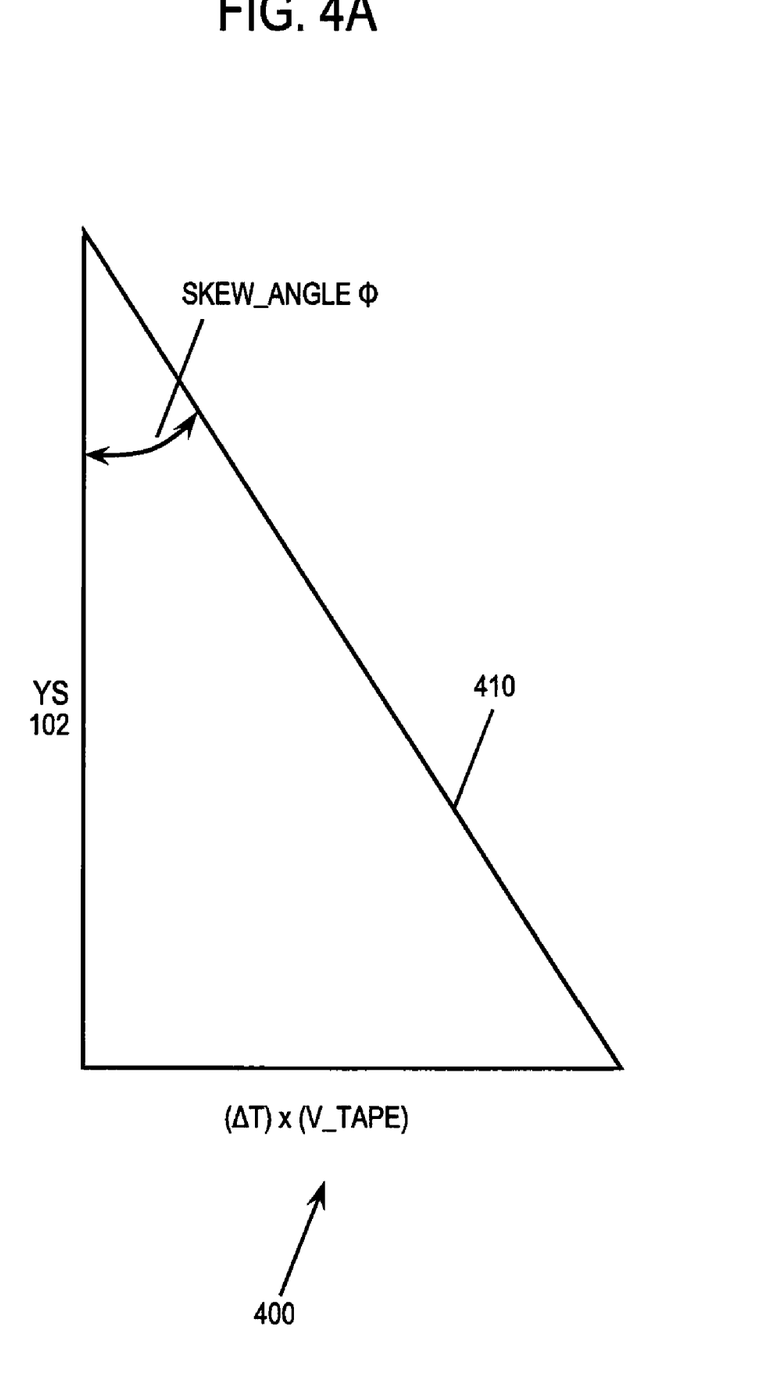
FIG. 4A graphically illustrates Applicants' method to determine a skew angle.

FIG. 4A graphically illustrates determining a slew angle $\Phi$ using a timing difference $\Delta T$ determined using a first servo element, such as servo element 170 (FIG. 1), and a second servo element, such as servo element 172 (FIG. 1), disposed on one microslider, such as microslider 120 (FIG. 1). Applicants' method forms a right triangle 400, wherein one side comprises a distance, such as distance YS 102 (FIG. 1), comprising the distance between the first servo element and the second servo element. A second side of the right triangle is defined by a distance calculated as the multiplication product of the timing difference $\Delta T$ and the velocity at which the sequential tape medium is moved across a read/write head comprising the two servo elements. The angle defined by a hypotenuse 410 and the side comprising distance YS 102 comprises skew angle $\Phi$.

Referring once again to FIG. 7B, in step 780 the method calculates a microslider skew adjustment using the tape skew angle of step 770. In certain embodiments, step 780 is performed by a controller, such as controller 820, in communication with the read/write head of step 705.

Figure 4B:
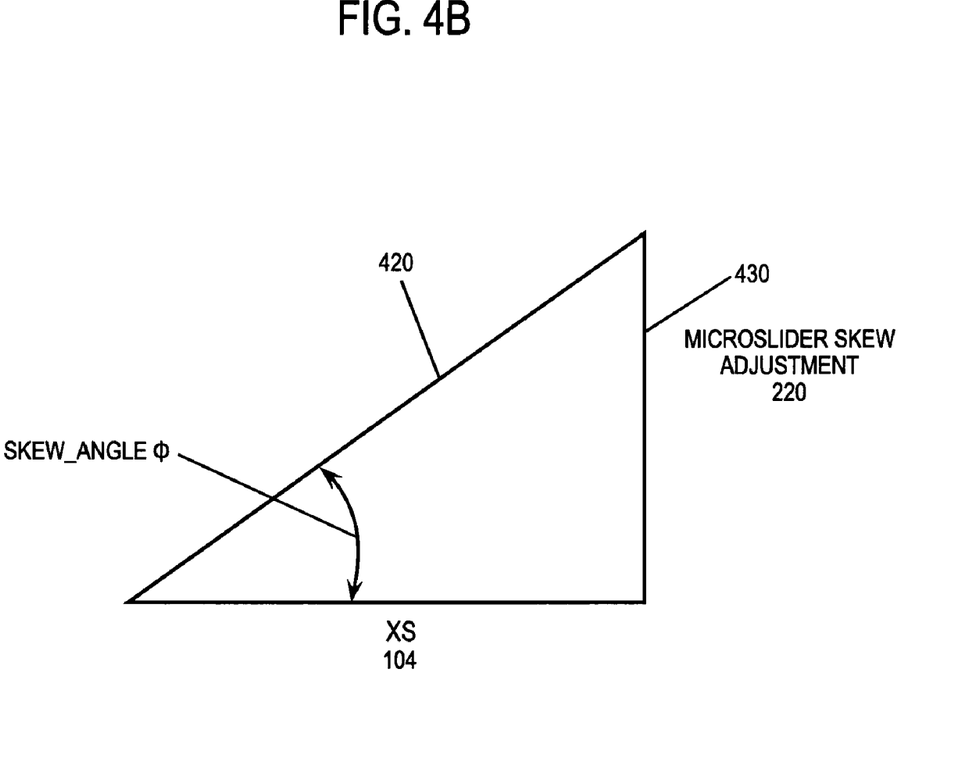
FIG. 4B graphically illustrates Applicants' method to determine a microslider skew adjustment.

FIG. 4B graphically illustrates determining a microslider skew adjustment 220 (FIG. 2B) using the skew angle $\Phi$ and a distance XS 104 (FIG. 1) comprising a distance between comparable servo elements disposed on two different microsliders, such as servo element 172 (FIG. 1) disposed on microslider 120 (FIG. 1) and servo element 173 (FIG. 1) disposed on microslider 121 (FIG. 1). Forming a right triangle 402 comprising a first side defined by distance XS 104 (FIG. 1), wherein a hypotenuse 420 extends outwardly from one end of the first side at skew angle $\Phi$ defines a second side 430 having a distance equal to microslider skew adjustment 220.

Referring once again to FIG. 7B, in step 790 the method offsets the first assembly of step 705 from the second assembly of step 705 by the microslider skew adjustment 220. In certain embodiments, step 790 is performed by a controller, such as controller 820, in communication with the read/write head of step 705.

Figure 5:
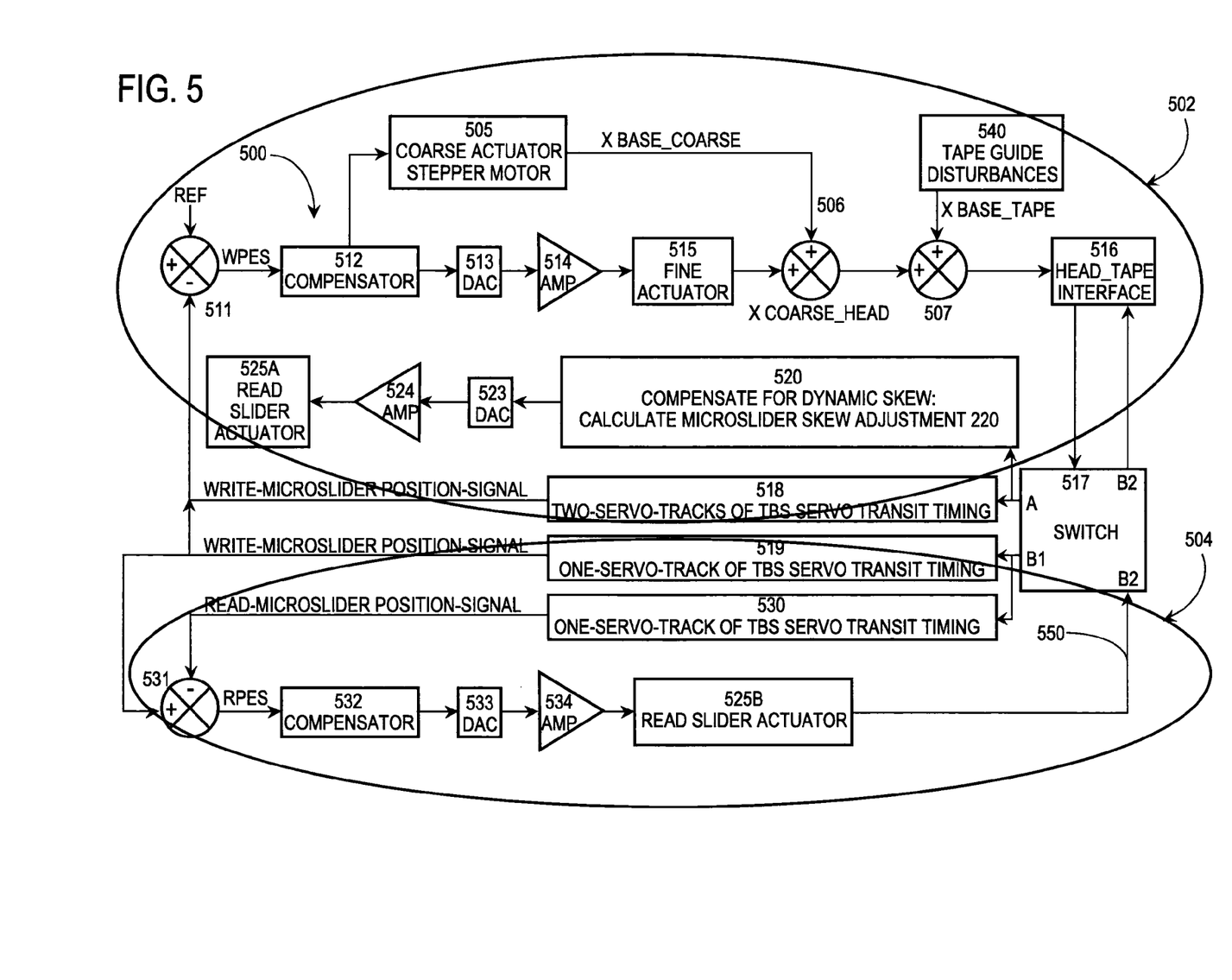
FIG. 5 illustrates a first embodiment of Applicants' circuitry to implement Applicants' method.

FIG. 5 illustrates one embodiment of Applicants' circuitry 500. In certain embodiments, circuitry 500 is disposed in a controller, such as controller 820 (FIG. 8), in communication with the read/write head of step 705 (FIG. 7A), such as read/write head 810 (FIG. 8). Circuitry 500 comprises a first control circuit 502 and a second control circuit 504. The first control circuit 502 utilizes two servo element disposed on a write microslider, such as servo elements 170 (FIG. 1) and 172 (FIG. 1) disposed on microslider 120 (FIG. 1) wherein write element 183 (FIG. 1) is encoding information in a sequential information storage medium.

In block 520, control circuit 502 calculates a dynamic skew for a moving sequential information storage medium, as described hereinabove. In block 518, control circuit, using two different timing based servo ("TBS") transit timings derived from each of servo bands 302 (FIGS. 3A, 3C) and 304 (FIGS. 3A, 3C), fine actuator 515 positions the write microslider to write information along a designed data track, such as data track 210 (FIGS. 2A, 2B). Coarse-actuator 505 with compensator integrator 512 positions body 160 of read/write head 810 (FIGS. 1, 8) to enable the fine-actuator 515 to operate in a center of its stroke. First control circuit components 512, 520, 523, 524, and 525, define a closed-loop system. Read microslider actuator 525A is driven by the skew-timing signal derived from the two servo elements on the write microslider, as described hereinabove.

The second control circuit 504 utilizes a servo element disposed on each microslider. As a result, only one servo element disposed on the write microslider is used to position that write microslider. One servo element disposed on the read microslider is used to position the read microslider relative to the write microslider. Feedback to the read microslider actuator is driven by the difference between the TBS timings of the write microslider 540 minus the TBS timings from the read microslider 530, as performed by comparator 531. Because communication link 550 interconnects read slider actuator 525B and switch 517, second control circuit components 516, 530, 532, 540, 533, 534, and 525B, comprise a closed-loop system.

Figure 6:
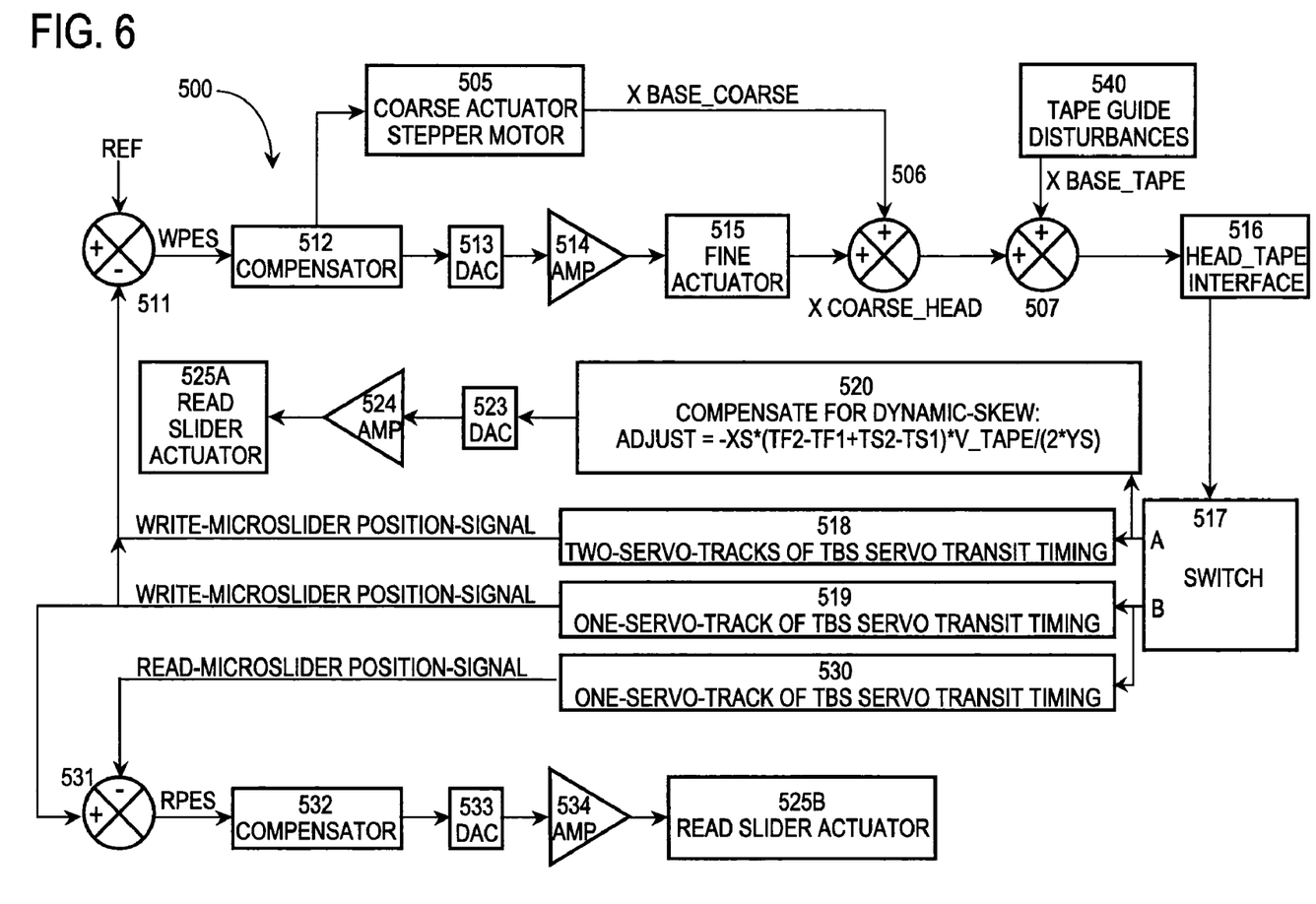
FIG. 6 illustrates a second embodiment of Applicants' circuitry to implement Applicants' method.

FIG. 6 illustrates a second embodiment of Applicants' control circuitry 500 wherein second control circuit 504 comprises an open-loop system rather than a closed loop system. The embodiment of FIG. 6 allows a correction to the read slider actuator in the second control circuit component 525B to be used as an open-loop corrective DC-offset to the read microslider actuator 525A in the first control circuit 502.

In certain embodiments, individual steps recited in FIGS. 1, 9, 10, 11, and/or 12, may be combined, eliminated, or reordered.

In certain embodiments, Applicants' invention includes instructions, such as instructions 832 (FIG. 8), residing in computer readable medium, such as for example computer readable medium 830 (FIG. 8), wherein those instructions are executed by a processor, such as processor 822 (FIG. 8), to perform one or more of steps 710, 720, 730, 740, 750, 760, 770, 780, and/or 790, recited in FIGS. 7A and 7B.

In other embodiments, Applicants' invention includes instructions residing in any other computer program product, where those instructions are executed by a computing device external to, or internal to, tape drive apparatus 800 (FIG. 8), to perform one or more of steps 710, 720, 730, 740, 750, 760, 770, 780, and/or 790, recited in FIGS. 7A and 7B. In either case, the instructions may be encoded in a computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to adjust the positions of a write element and read element disposed on a read/write head comprising a first assembly independently moveable along a first axis and comprising a first servo element, a second servo element, and said write element disposed between said first servo element and said second servo element, and a second assembly independently moveable along said first axis and comprising a third servo element, a fourth servo element, and said read element disposed between said third servo element and said fourth servo element, said method comprising:

moving a sequential information storage medium comprising a first servo band and a second servo band adjacent to said read/write head along a second axis, wherein said second axis is substantially orthogonal to said first axis;

determining a first time, wherein said first servo element detects a first servo pattern disposed in said first servo band at said first time;

determining a second time, wherein said second servo element detects a second servo pattern disposed in said second servo band at said second time;

calculating a timing difference comprising the difference between said first time and said second time;

setting a skew angle using said timing difference wherein:

said first servo element is disposed a first distance from said second servo element;

said tape is moved past said read/write head at a velocity;

said setting step further comprises calculating said skew angle using said first distance, said timing difference, and said velocity said first servo element is disposed a second distance from said third servo element;

said method further comprising:

calculating a microslider skew adjustment using said skew angle and said second distance; and offsetting said first assembly from said second assembly by said microslider skew adjustment.

2. The method of claim 1, wherein said supplying a read/write head further comprises:

supplying a read/write head comprising a first control circuit, a second control circuit, and a switch interconnected to both said first control circuit and said second control circuit;

wherein said first control circuit utilizes said first servo element and said second servo element to determine said skew angle;

wherein said second control circuit utilizes said first servo element and said third servo element to determine position error signals;

activating said first control circuit during a first time period;

activating said second control circuit during a second time period;

wherein said first time period differs from said second time period.

3. The method of claim 2, further comprising:

positioning said first assembly by said second control circuit based upon position error signals;

positioning said second assembly with respect to said first assembly by said first control circuit based upon said skew angle.

4. An article of manufacture comprising a microprocessor and a non-transitory computer readable medium comprising computer readable program code disposed therein for servo control of a read/write head comprising a first assembly independently moveable along a first axis and comprising a first servo element, a second servo element, and said write element disposed between said first servo element and said second servo element, and a second assembly independently moveable along said first axis and comprising a third servo element, a fourth servo element, and said read elements disposed between said third servo element and said fourth servo element the computer readable program code comprising a series of computer readable program steps to effect:

moving a sequential information storage medium adjacent to said read/write head along a second axis, wherein said second axis is substantially orthogonal to said first axis, and wherein said sequential information storage medium comprises a first servo band and a second servo band;

determining a first time, wherein said first servo element detects a first servo pattern disposed in said first servo band at said first time;

determining a second time, wherein said second servo element detects a second servo pattern disposed in said second servo band at said second time;

calculating a timing difference comprising the difference between said first time and said second time;

setting a skew angle using said timing difference;

wherein:

said first servo element is disposed a first distance from said second servo element;

said tape is moved past said read/write head at a velocity;

said computer readable program code to set said skew angle further comprises a series of computer readable program steps to effect calculating said skew angle using said first distance, said timing difference, and said velocity;

said first servo element is disposed a second distance from said third servo element;

said computer readable program code further comprising a series of computer readable program steps to effect:

calculating a microslider skew adjustment using said skew angle and said second distance; and offsetting said first assembly from said second assembly by said microslider skew adjustment.

5. The article of manufacture of claim 4, further comprising a first control circuit, a second control circuit, and a switch interconnected to both said first control circuit and said second control circuit, said computer readable program code further comprising a series of computer readable program steps to effect:

utilizing said first servo element and said second servo element by said first control circuit to determine said skew angle;

utilizing said first servo element and said third servo element by said second control circuit to determine position error signals;

activating said first control circuit during a first time period;

activating said second control circuit during a second time period;

wherein said first time period differs from said second time period.

6. The article of manufacture of claim 5, said computer readable program code further comprising a series of computer readable program steps to effect:

positioning said first assembly by said second control circuit based upon position error signals;

positioning said second assembly with respect to said first assembly by said first control circuit based upon said skew angle.

7. A computer program product encoded in a non-transitory computer readable medium, said computer program product being useable with a programmable computer processor for servo control of a read/write head comprising a first assembly independently moveable along a first axis and comprising a first servo element, a second servo element, and said write element disposed between said first servo element and said second servo element, and a second assembly independently moveable along said first axis and comprising a third servo element, a fourth servo element, and said read elements disposed between said third servo element and said fourth servo element, comprising:

computer readable program code which causes said programmable processor to move a sequential information storage medium adjacent to said read/write head along a second axis, wherein said second axis is substantially orthogonal to said first axis, and wherein said sequential information storage medium comprises a first servo band and a second servo band;

computer readable program code which causes said programmable processor to determine a first time, wherein said first servo element detects a first servo pattern disposed in said first servo band at said first time;

computer readable program code which causes said programmable processor to determine a second time, wherein said second servo element detects a second servo pattern disposed in said second servo band at said second time;

computer readable program code which causes said programmable processor to calculate a timing difference comprising the difference between said first time and said second time;

setting a skew angle using said timing difference;

wherein:

said first servo element is disposed a first distance from said second servo element;

said tape is moved past said read/write head at a velocity;

said computer readable program code to set said skew angle further comprises computer readable program code which causes said programmable processor to calculate said skew angle using said first distance, said timing difference, and said velocity, said first servo element is disposed a second distance from said third servo element;

further comprising:

computer readable program code which causes said programmable processor to calculate a microslider skew adjustment using said skew angle and said second distance; and computer readable program code which causes said programmable processor to offset said first assembly from said second assembly by said microslider skew adjustment.

8. The computer program product of claim 7, further comprising:

computer readable program code which causes said programmable processor to utilize said first servo element and said second servo element by a first control circuit to determine said skew angle;

computer readable program code which causes said programmable processor to utilize said first servo element and said third servo element by a second control circuit to determine position error signals;

computer readable program code which causes said programmable processor to activate said first control circuit during a first time period;

computer readable program code which causes said programmable processor to activate said second control circuit during a second time period;

wherein said first time period differs from said second time period.

9. The computer program product of claim 8, further comprising:
  computer readable program code which causes said programmable processor to position said first assembly using said second control circuit based upon position error signals;
  computer readable program code which causes said programmable processor to position said second assembly with respect to said first assembly using said first control circuit based upon said skew angle.

* * * * *